United States Patent
Roßberg et al.

(10) Patent No.: US 12,516,996 B2
(45) Date of Patent: Jan. 6, 2026

(54) PRESSURE TRANSDUCER HAVING AN ELECTROMECHANICAL CONVERTER

(71) Applicant: Endress+Hauser SE+Co. KG, Maulburg (DE)

(72) Inventors: Andreas Roßberg, Bad Säckingen (DE); Nils Ponath, Lörrach (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 344 days.

(21) Appl. No.: 18/256,528

(22) PCT Filed: Nov. 25, 2021

(86) PCT No.: PCT/EP2021/082989
§ 371 (c)(1),
(2) Date: Jun. 8, 2023

(87) PCT Pub. No.: WO2022/122397
PCT Pub. Date: Jun. 16, 2022

(65) Prior Publication Data
US 2024/0019329 A1     Jan. 18, 2024

(30) Foreign Application Priority Data
Dec. 8, 2020   (DE) .................. 10 2020 132 687.4

(51) Int. Cl.
*G01L 19/14*   (2006.01)
*G01L 9/00*    (2006.01)
*G01L 19/00*   (2006.01)

(52) U.S. Cl.
CPC .......... *G01L 19/147* (2013.01); *G01L 9/0075* (2013.01); *G01L 19/0069* (2013.01); *G01L 19/0084* (2013.01)

(58) Field of Classification Search
None
See application file for complete search history.

(56) References Cited

U.S. PATENT DOCUMENTS

| 4,276,533 A | 6/1981 | Tominaga et al. |
| 6,561,037 B2 * | 5/2003 | Bohler ................. G01L 9/0072 |
| | | 73/706 |

(Continued)

FOREIGN PATENT DOCUMENTS

| DE | 102005008959 A1 | 9/2006 |
| DE | 102014214866 A1 | 1/2015 |

(Continued)

*Primary Examiner* — Peter J Macchiarolo
*Assistant Examiner* — Jermaine L Jenkins
(74) *Attorney, Agent, or Firm* — Mark A. Logan; Endress+Hauser (USA) Holding, Inc.

(57) ABSTRACT

An overload-resistant pressure measuring sensor includes a pressure sensor arranged in an interior of a sensor housing and can be exposed, through an opening in the sensor housing, to a medium under pressure of up to 1000 bar. The medium may be a hydrogen-containing medium and can be measured with high measurement accuracy. The pressure sensor is mounted on connection elements protruding into the interior and free-standing in the interior such that the pressure sensor is exposed to the pressure prevailing in the interior on all sides. The pressure sensor includes two ceramic measuring bodies connected to one another while enclosing a pressure chamber, and are each deformable by the pressure acting thereon, and further includes an electromechanical transducer which converts a mechanical variable that is dependent on a sum of the pressure-dependent deformations of both measuring bodies into a measurable electrical measurement variable.

15 Claims, 2 Drawing Sheets

(56) References Cited

U.S. PATENT DOCUMENTS

| | | | | |
|---|---|---|---|---|
| 6,715,356 B2* | 4/2004 | Gerst | ................... | G01L 9/0075 |
| | | | | 73/715 |
| 8,468,894 B2* | 6/2013 | Gruhler | .................. | G01L 19/04 |
| | | | | 73/708 |
| 11,846,555 B2* | 12/2023 | Lopatin | ............... | G01L 19/0046 |
| 12,000,742 B2* | 6/2024 | Lopatin | ............... | G01L 19/0046 |
| 2008/0066555 A1* | 3/2008 | Rezgui | ................ | G01L 19/0645 |
| | | | | 73/715 |

FOREIGN PATENT DOCUMENTS

| | | |
|---|---|---|
| DE | 102019113127 A1 | 11/2020 |
| JP | 58107682 A | 6/1983 |
| JP | 1284727 A | 11/1989 |

\* cited by examiner

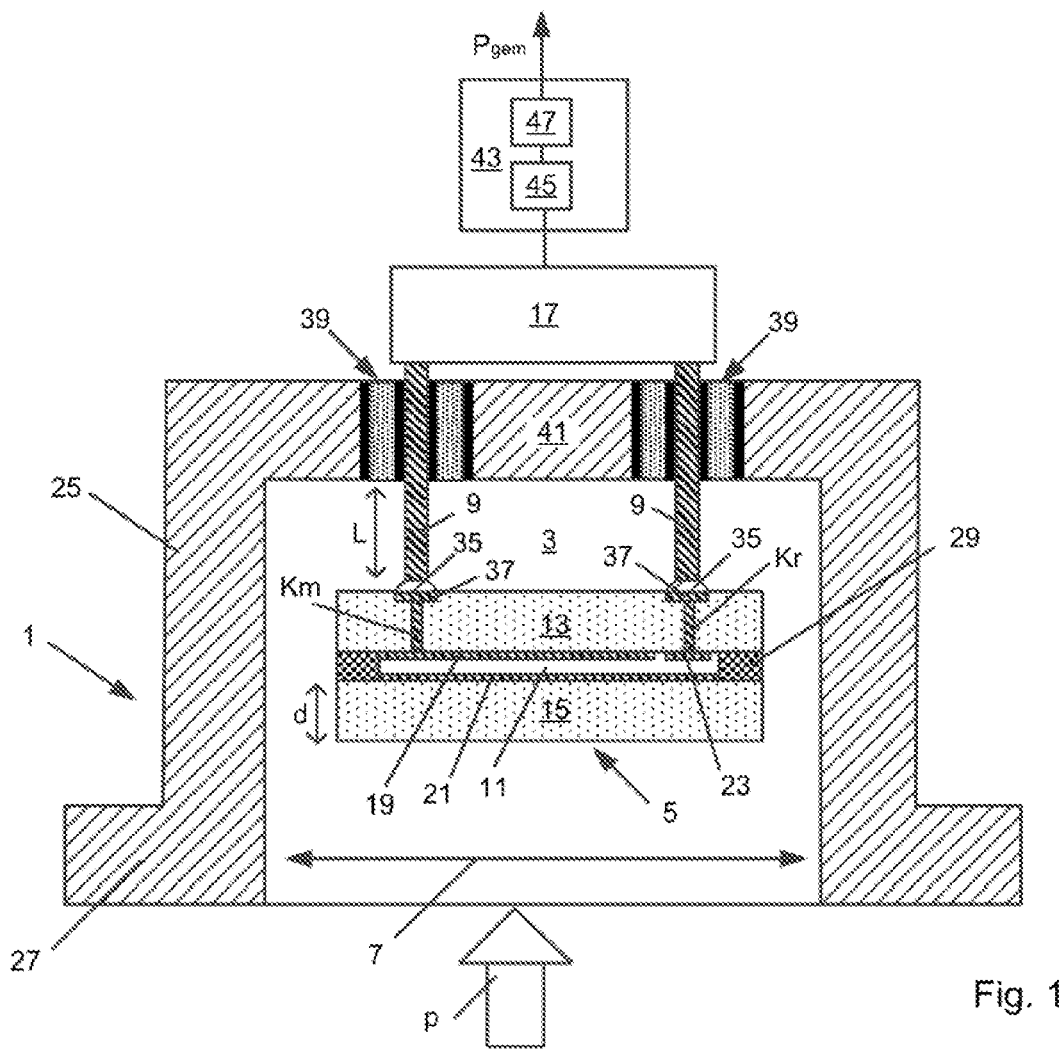
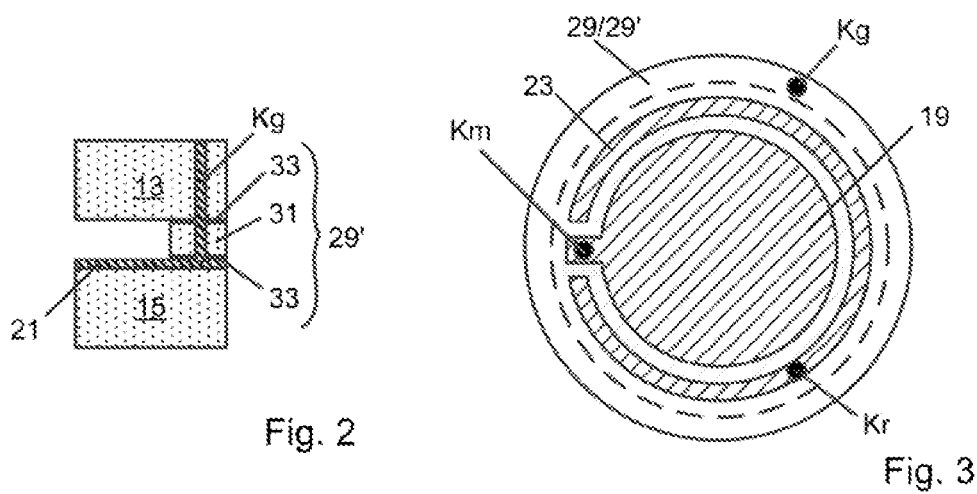

PRESSURE TRANSDUCER HAVING AN ELECTROMECHANICAL CONVERTER

CROSS-REFERENCE TO RELATED APPLICATIONS

The present application is related to and claims the priority benefit of DPMA Patent Application No. 10 2020 132 687.4, filed on Dec. 8, 2020, and International Patent Application No. PCT/EP2021/082989, filed Nov. 25, 2021, the entire contents of which are incorporated herein by reference.

TECHNICAL FIELD

The invention relates to a pressure measuring sensor for measuring a pressure with a pressure sensor, wherein the pressure sensor is arranged in an interior of a sensor housing and can be exposed, through an opening in the sensor housing, to a medium under the pressure to be measured.

BACKGROUND

Pressure measuring sensors are used in particular in measuring and regulating technology and also in process automation for measuring pressures.

Pressure measuring sensors can be divided into two groups. One group comprises pressure measuring sensors whose pressure sensor can be exposed directly to a pressure to be measured. These pressure measuring sensors comprise ceramic pressure sensors with a rigid base body and a measuring membrane which is arranged on the base body while enclosing a pressure chamber, and is deformable by a pressure acting thereon. Ceramic pressure sensors can be exposed directly to the medium under the pressure to be measured due to the high chemical and mechanical resistance of ceramic. The other group comprises pressure measuring sensors whose pressure sensor is subjected to the pressure to be measured via a diaphragm seal connected upstream of the pressure sensor. Diaphragm seals comprise a separation diaphragm which can be subjected to pressure on the outside and under which a pressure receiving chamber filled with a pressure-transmitting liquid is enclosed. A pressure transmission line likewise filled with the liquid is connected to the pressure receiving chamber, via which line the pressure is transmitted to the pressure sensor.

There are applications in which the medium under the pressure to be measured contains hydrogen. Examples thereof are applications in the chemical industry, in the semiconductor industry, and also increasingly applications associated with the use of renewable energy sources. The latter include, for example, applications associated with the generation of hydrogen by electrolysis of water, the storage of hydrogen in hydrogen tanks, the filling of hydrogen, and associated with the generation of energy by means of fuel cells, as are used, for example, in the vehicle industry, in particular in automobiles, buses, trucks and trains. In these applications, very high pressures to be measured may also occur under certain circumstances.

In the case of diaphragm seals with metallic separating diaphragms such as stainless steel separating diaphragms, the problem regularly occurs that hydrogen present in the medium can diffuse through the separating diaphragm. Hydrogen penetrating the diaphragm seal leads to a change in the pressure transmission properties of the diaphragm seal, which in turn results in a corresponding measurement error of pressure measurements carried out using the diaphragm seal. Moreover, hydrogen penetrating into metallic separating diaphragms regularly leads to embrittlement of the separating diaphragms, which in turn results in a significant deterioration in the mechanical stability. Cracks attributable to embrittlement or even a diaphragm breakage of the separation diaphragm lead to failure of the diaphragm seal and, under certain circumstances, also to contamination of the medium under the pressure to be measured with the pressure-transmitting liquid.

This problem can be counteracted by means of a layer which is applied to the outer side of the separating diaphragm and is designed as a hydrogen diffusion barrier, such as a gold layer or a gold-rhodium layer. As a further alternative, DE 10 2006 056 173 A1 describes a diaphragm seal with a separating diaphragm made of stainless steel, on the outer side of which a layer of aluminum oxide is arranged. Aluminum oxide has a hydrogen diffusion coefficient which is significantly lower than the hydrogen diffusion coefficients of metallic layers. Accordingly, the layer of aluminum oxide acts as a highly effective hydrogen diffusion barrier.

Irrespective of the choice of the layer material, however, it cannot be completely ruled out that over time, in particular due to improper treatment, damaged points or even cracks can occur in the layer, which impair its function as a hydrogen diffusion barrier.

In this respect, measuring membranes of ceramic pressure sensors, consisting entirely of ceramic, form a significantly better and more durable protection against hydrogen diffusion due to the low hydrogen diffusion rate in ceramic. Ceramic pressure sensors are usually clamped in a sensor housing in such a way that only their measuring membrane can be exposed to the medium under the pressure to be measured, through an opening in the sensor housing. In order to prevent thermomechanical stresses caused by the different coefficients of thermal expansion of the metallic sensor housing and of the ceramic pressure sensor adversely affecting the achievable measurement accuracy, a clamping device is usually used for this purpose in which an outer edge of the pressure sensor is clamped in the sensor housing, with interposition of a seal sealing the interior of the sensor housing off from the medium, in such a way that the measuring membrane can be exposed to the medium under the pressure to be measured through an opening in the sensor housing. An example of this is described in DE 103 34 854 A1.

However, the pressure measurement range of these pressure measuring sensors is limited due to the deformability of the seals and the magnitude of the clamping forces required for clamping the pressure sensor, which rise as the pressure to be measured increases. For example, very high forces acting on an O-ring can lead to the sealing material of the O-ring being irreversibly extruded into a gap surrounding the pressure sensor in the sensor housing, which ultimately leads to failure of the seal. Accordingly, only pressures in a pressure measurement range of less than or equal to 100 bar can generally be measured with these pressure measuring sensors. By means of special precautions, in particular with respect to the clamping, higher pressures, for example pressures of up to 400 bar, can also be measured under certain circumstances.

Another problem is that the sealing materials which can be used to seal the interior of the sensor housing off from the medium acting on the measuring membrane, such as elastomers or thermoplastics, are not diffusion-tight. This means that hydrogen present in the medium can penetrate into the interior of the sensor housing virtually unhindered. This is undesirable or even impermissible for explosion protection reasons in particular in the case of pressure measuring sensors used in potentially explosive areas.

The problem of diffusion tightness can be countered by mounting the pressure sensor in the sensor housing by means of a diffusion-tight joint. An example of this is described in German patent application DE 10 2018 123041 A. The pressure measuring sensor described therein comprises a ceramic pressure sensor which is arranged in an interior of a sensor housing and can be exposed, through an opening in the sensor housing, to a medium under the pressure to be measured.

In this pressure measuring sensor, the sensor housing is a carrier made of titanium, which comprises a free-standing, tubular carrier region extending parallel to the surface normal on the measuring membrane. One exemplary embodiment provides for the end region of the carrier opposite the opening to have a radially inwardly extending shoulder which adjoins the end of the tubular carrier region. In this variant, an outer edge of an end face, facing the shoulder, of a rigid base body, which is connected to a measuring membrane while enclosing a pressure chamber, is connected by means of a diffusion-tight joint to an inner edge region of the shoulder that is spaced apart from the tubular carrier region. An end region of the carrier opposite the shoulder is connected to a process connection made of stainless steel via which the interior of the carrier can be subjected to the pressure to be measured. In this case, the tubular carrier region serves for thermomechanical decoupling of the pressure sensor and process connection. For this purpose, it preferably has a small wall thickness of 1 mm to 2 mm.

However, the pressure measurement range of this pressure measuring sensor is limited to low pressures, such as pressures of less than or equal to one bar. One reason for this is the limited pressure resistance of the annular joint, which is only exposed on the outside to the pressure to be measured.

In principle, it is possible to design ceramic pressure sensors with a rigid base body and a measuring membrane mounted on the base body while enclosing a pressure chamber with corresponding dimensioning so that very high pressures, such as pressures of greater than or equal to 400 bar, can also be measured therewith. In order that the pressure sensor can also withstand overloads exceeding the upper measurement range limit of the pressure sensor at least temporarily, its membrane thickness should be greater than that required for pressure measurements within the pressure measurement range. However, such an over-dimensioned membrane thickness inevitably leads to a reduction in the pressure-dependent deformation of the measuring membrane, which is often also referred to as membrane stroke, when the measuring membrane is subjected to pressures within the pressure measurement range. Accordingly, the overload resistance obtained by increasing the membrane thickness is at the expense of the pressure measurement accuracy achievable within the pressure measurement range.

SUMMARY

It is an object of the invention to specify a pressure measuring sensor, in particular an overload-resistant pressure measuring sensor, with which high pressures, in particular pressures of up to 1000 bar, of a medium under the pressure to be measured, in particular of a hydrogen-containing medium, can be measured with high measurement accuracy.

For this purpose, the invention comprises a pressure measuring sensor for measuring a pressure with a pressure sensor, wherein the pressure sensor is arranged in an interior of a sensor housing and can be exposed, through an opening in the sensor housing, to a medium under the pressure to be measured, which is characterized in that the pressure sensor:
is mounted on connection elements protruding into the interior and free-standing in the interior in such a way that the pressure sensor is exposed to the pressure prevailing in the interior on all sides,
comprises two measuring bodies which are connected to one another while enclosing a pressure chamber, and are each deformable by the pressure acting thereon, and
comprises an electromechanical transducer which converts a mechanical variable that is dependent on a sum of the pressure-dependent deformations of both measuring bodies into a measurable electrical measurement variable.

Thanks to the pressure acting substantially isostatically on all sides on the pressure sensor in the interior and likewise externally on all sides on the connection elements which are free-standing in the interior and connected to the pressure sensor, pressure measuring sensors according to the invention provide the advantage that the mechanical connections between the pressure sensor and the connection elements are exposed to practically no significant or only very low forces, even at very high pressures. This is in particular the case because the pressure acting externally on one side of the connection elements and of the mechanical connections is counteracted by the pressure of the same magnitude acting on the opposite side of the respective connection element or the respective mechanical connection. This pressure likewise acts on the pressure sensor so that practically no tensile or shear loads are exerted on the mechanical connections by the pressure acting on the pressure sensor.

Another advantage is that, with appropriate dimensioning of the two interconnected measuring bodies, very high pressures, e.g. pressures in a pressure measurement range of up to 1000 bar or even above, can also be measured. Since the pressure sensor is exposed in the interior directly to the medium under the pressure to be measured, the achievable measurement accuracy is not impaired by the possibly pressure-dependent and temperature-dependent pressure transmission behavior of a diaphragm seal upstream of the pressure sensor.

In addition, the two measuring bodies which are each deformable by the pressure acting thereon offer the advantage that the pressure measurement takes place on the basis of the sum of the pressure-dependent deformations of both measuring bodies. In this way, a high measurement accuracy can also be achieved even if the thickness of the two measuring bodies is dimensioned in such a way that the measuring bodies can withstand overloads exceeding an upper measurement range limit of a pressure measurement range of the pressure sensor. Alternatively, a higher upper measurement range limit can of course also be applied. In this case, the overload resistance is reduced accordingly with respect to the overloads exceeding the higher upper measurement range limit.

A first development is characterized in that:
at least one of the connection elements or each connection element is in each case designed as an electrically conductive connection line, the end of which is connected by means of an electrically conductive mechanical connection to an associated electrical connection of the pressure sensor, which is arranged on an outer side of the pressure sensor, and each connection element designed as a connection line extends through a housing wall through a pressure-resistant feedthrough inserted into the housing wall of the sensor housing in a manner electrically insulated from the housing wall.

A development of the first development is characterized in that each feedthrough: is designed as a hydrogen-diffusion-tight feedthrough, is designed as a ceramic feedthrough or as a glass feedthrough, and/or is designed as a feedthrough pressure-resistant to pressures exceeding an upper measurement range limit of the pressure sensor, to pressures exceeding an overload resistance of the pressure sensor, and/or to pressures of up to 1700 bar or up to 2000 bar.

An embodiment of the first development is characterized in that each feedthrough is arranged in a housing wall region of the sensor housing opposite the opening.

A second development is characterized in that the sensor housing surrounding the interior: consists of metal or stainless steel, is hydrogen-diffusion-tight, and/or is designed as a sensor housing pressure-resistant to pressures exceeding an upper measurement range limit of the pressure sensor, to pressures exceeding an overload resistance of the pressure sensor, and/or to pressures of up to 2000 bar.

A third development is characterized in that the pressure sensor is connected to one end of each connection element by means of a mechanical connection, by means of a mechanical, electrically conductive connection or a connection designed as a soldering, in such a way that the connection is exposed externally on all sides to the pressure prevailing in the interior.

A fourth development is characterized in that the connection elements: are designed as rod-shaped elements which are straight, curved or of another shape, have a free-standing length of 1 mm to 10 mm in the interior, have a diameter of 0.25 mm to 3 mm and/or a cross-sectional area of 0.05 $mm^2$ to 7 $mm^2$, are designed as metallic connection elements, consist of Kovar®, stainless steel, nickel, copper, a nickel-iron alloy, a copper-nickel alloy, molybdenum, Alumel® or Constantan, and/or are surrounded by a sheath or insulation.

A fifth development is characterized in that:

the pressure sensor is designed as an absolute pressure sensor which measures the pressure acting on the two measuring bodies as absolute pressure relative to an internal pressure prevailing in the pressure chamber, an internal pressure configured as a vacuum pressure, or an internal pressure in the order of magnitude of 1 bar, and the two measuring bodies are connected to one another via a pressure-resistant connection or a pressure-resistant and hydrogen-diffusion-tight connection, wherein the connection surrounds the pressure chamber externally on all sides.

Further developments are characterized in that:

the two measuring bodies consist of glass and are connected to one another via a connection which surrounds the pressure chamber externally on all sides, or via a connection which surrounds the pressure chamber externally on all sides and comprises a glass ring and/or a glass soldering, or the two measuring bodies consist of metal or stainless steel and are connected to one another via a connection which surrounds the pressure chamber externally on all sides, or via a connection which surrounds the pressure chamber externally on all sides and comprises a weld, or the two measuring bodies consist of ceramic and are connected to one another via a connection which surrounds the pressure chamber externally on all sides, wherein the connection:

is designed as an active braze or as a glass soldering, or comprises a ring or a ring formed as a ceramic ring, wherein the ring:

either is connected in a hydrogen-diffusion-tight manner to each of the two measuring bodies via a hydrogen-diffusion-tight joint or via a joint designed as a weld produced by means of a laser welding method, or is designed as a component of one of the two measuring bodies and is connected in a hydrogen-diffusion-tight manner to the other measuring body via a hydrogen-diffusion-tight joint or a joint designed as a weld produced by means of a laser welding method.

A sixth further development is characterized in that the transducer of the pressure sensor is connected via the connection elements to sensor electronics arranged outside the sensor housing, which sensor electronics are designed to provide a measurement signal which reproduces a pressure measured by means of the pressure sensor.

A seventh development is characterized in that:

the transducer comprises a measuring electrode which is arranged on an inner side of one of the two measuring bodies and, together with a counter electrode arranged on an inner side of the other measuring body facing this measuring body, forms a capacitor with a measuring capacitance which is dependent on the sum of the pressure-dependent deformations of both measuring bodies, and the measuring electrode and the counter electrode are each electrically conductively connected to a connection arranged on an outer side of the pressure sensor via a connection line extending through one of the two measuring bodies or via a contact pin extending through one of the two measuring bodies.

A development of the seventh development is characterized in that the contact pin connected electrically conductively to the counter electrode arranged on the inner side of one of the two measuring bodies: runs through the other measuring body opposite the counter electrode, and either is electrically conductively connected to the counter electrode via an electrically conductive connection connecting the two measuring bodies to one another, or extends through a connection connecting the two measuring bodies to one another as far as a region of the counter electrode which is adjacent to an end face of the connection facing away from the measuring body surrounding the contact pin.

An eighth development is characterized in that the measuring bodies consist of ceramic, glass, metal or stainless steel.

A further development is characterized in that the pressure sensor is designed to measure pressures in a pressure measurement range of greater than or equal to 400 bar and/or of less than or equal to 1000 bar, and/or the pressure sensor is designed as a pressure sensor overload-resistant to overloads exceeding an upper measurement range limit of the pressure sensor of up to 1800 bar or up to 5500 bar.

A further development is characterized in that the measuring bodies are each designed as substantially disk-shaped or as structurally identical, substantially disk-shaped measuring bodies which each have a base area of 200 $mm^2$ to 1300 $mm^2$ and/or a thickness of 5 mm to 10 mm.

BRIEF DESCRIPTION OF THE DRAWINGS

The invention and its advantages will now be explained in detail using the figures in the drawing, in which two exemplary embodiments are shown. The same components are provided with the same reference signs in the figures. In order to be able to represent components of very different sizes, true-to-scale representation has been dispensed with.

FIG. 1 shows a pressure measuring sensor;

FIG. 2 shows an alternative embodiment of a connection of the two measuring bodies of FIG. 1;

FIG. 3 shows an inner side of one of the measuring bodies of FIG. 1;

DETAILED DESCRIPTION

Figure 4:
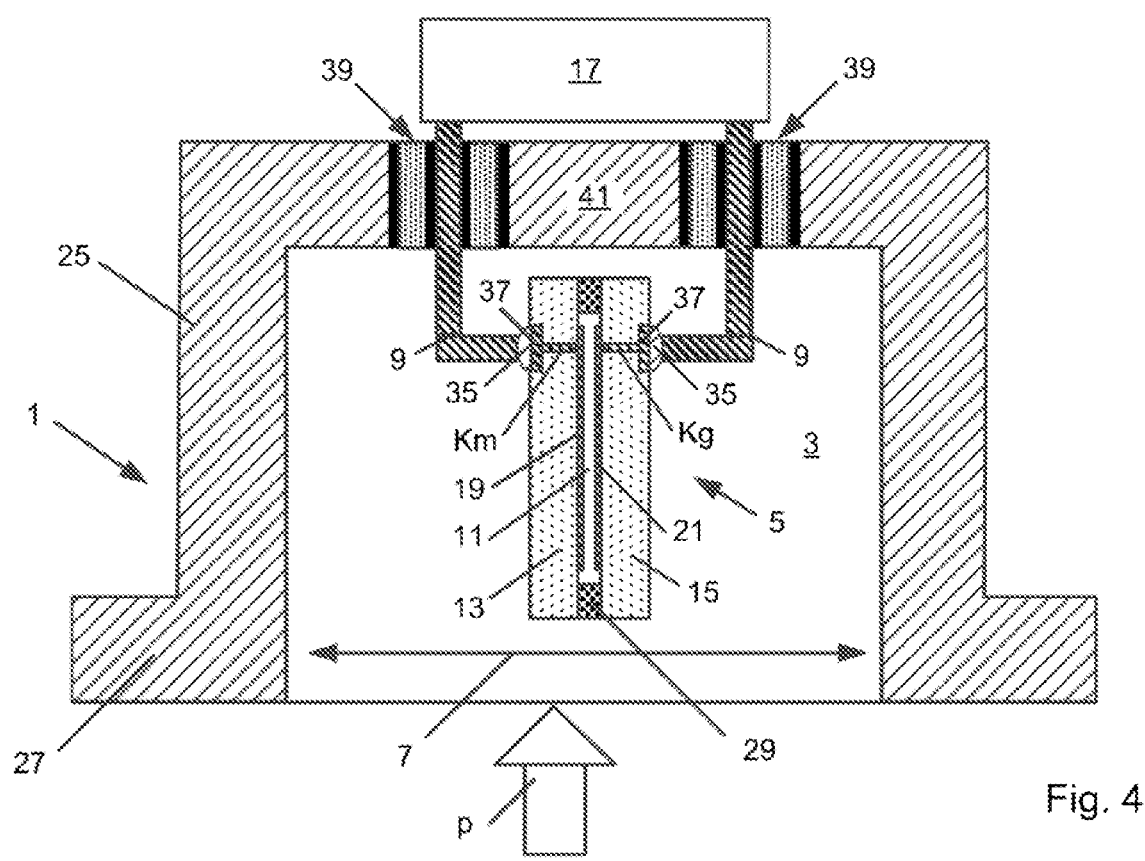
FIG. 4 shows a further pressure measuring sensor.

FIG. 1 shows a pressure measuring sensor with a sensor housing 1 and a pressure sensor 5 arranged in an interior 3 of the sensor housing 1. The pressure sensor 5 can be exposed, through an opening 7 in the sensor housing 1, to a medium under the pressure p to be measured.

Furthermore, the pressure sensor 5 is mounted in the interior 3 on connection elements 9 protruding into the interior 3 and free-standing in the interior 3 such that the pressure sensor 5 is exposed to the pressure p prevailing in the interior 3 on all sides.

The pressure sensor 5 comprises two measuring bodies 13, 15 which are connected to one another while enclosing a pressure chamber 11, and are each deformable by the pressure p acting thereon. FIG. 1 shows, as an example, two substantially structurally identical disk-shaped measuring bodies 13, 15 of the same thickness d. This largely symmetrical sensor structure offers the advantage that both measuring bodies 13, 15 contribute equally to the overload resistance of the pressure sensor 5, so that, with appropriate dimensioning of both measuring bodies 13, 15, a correspondingly higher overload resistance of the pressure sensor 5 can be achieved. Alternatively, however, measuring bodies of different thickness that are each deformable in a pressure-dependent manner can also be used within the pressure measurement range of the pressure measuring sensor.

The pressure sensor 5 shown as an example in FIG. 1 is designed as a ceramic pressure sensor. A suitable ceramic of the pressure sensor 5 is, for example, an oxide ceramic, such as aluminum oxide ($Al_2O_3$), with both measuring bodies 13, 15 preferably consisting of the same ceramic.

Regardless of the embodiment of the measuring bodies 13, 15 in this regard, the pressure sensor 5 comprises an electromechanical transducer which converts a mechanical variable dependent on a sum of the pressure-dependent deformations of both measuring bodies 13, 15 into a measurable electrical measurement variable.

This electrical measurement variable is measurable for example by means of sensor electronics 17 which can be connected or are connected to the transducer, and can be converted into a measurement signal reproducing the measured pressure. The sensor electronics 17 can optionally be arranged either inside or, as shown in FIG. 1, outside the interior 3 of the sensor housing 1. An arrangement of the sensor electronics 17 outside the sensor housing 1 offers the advantage that the sensor electronics 17 are not exposed to the pressures prevailing in the sensor housing 1 and therefore no correspondingly pressure-resistant encapsulation of the sensor electronics 17 is required.

FIG. 1 shows, as an example, a capacitive transducer which comprises a measuring electrode 19 which is arranged on an inner side of one of the two measuring bodies 13 and, together with a counter electrode 21 arranged on an inner side of the other measuring body 15 facing this measuring body 13, forms a capacitor with a measuring capacitance $C_p$ dependent on the sum of the pressure-dependent deformations of both measuring bodies 13, 15. In this case, the sensor electronics 17 comprise, for example, a capacitance measuring circuit which is connected to the capacitor and outputs a measurement signal corresponding to the measured measuring capacitance $C_p$. Optionally, the transducer can additionally comprise a reference capacitor with a substantially pressure-independent reference capacitance $C_{ref}$. FIG. 1 shows, as an example, a reference capacitor formed by a reference electrode 23, which externally surrounds the measuring electrode 19 and is spaced apart from the measuring electrode 19, and the counter electrode 21. In this case, the measurement signal corresponds to a measurement variable which can be determined using the measurement capacitance $C_p$ and the reference capacitance $C_{ref}$ and reproduces the measured pressure, such as a measurement variable which can be determined as the product of a constant k and a difference of the reciprocal values of the two capacitances according to: $f = k \, (C_p - C_{ref})/C_p$. This measurement variable has a linear dependence on the pressure p to be measured and a lower temperature dependence than the measuring capacitance $C_p$.

Alternatively, instead of the transducer shown here, a differently designed capacitive transducer or a transducer based on another transducer principle, for example a resistive or an optical transducer, can also be used.

Pressure measuring sensors according to the invention have the advantage already mentioned at the outset. Individual components of the pressure measuring sensor can each have different embodiments, which can be used individually or in combination with one another.

Optionally, the sensor housing 1 consists of a metal, such as a stainless steel, for example. Alternatively or additionally, the interior 3 of the sensor housing 1 is surrounded, for example, by a hydrogen-diffusion-tight, pressure-resistant housing wall 25. The greater the wall thickness of the housing wall 25, the higher the pressure resistance of the sensor housing 1. Optionally, the pressure resistance can additionally be increased by the shaping of the housing wall 25.

In this respect, the sensor housing 1 is designed, for example, as a sensor housing 1 pressure-resistant to pressures p exceeding an upper measurement range limit of the pressure sensor 5, to pressures p exceeding an overload resistance of the pressure sensor 5, and/or to pressures p of up to 2000 bar. For this purpose, the housing wall 25 preferably has a wall thickness predetermined depending on its geometry and on the material of the housing wall 25, by means of which a pressure resistance corresponding to the desired pressure resistance of the sensor housing 1 is ensured. A pressure resistance of the sensor housing 1 exceeding the overload resistance of the pressure sensor 5 offers the advantage that the sensor housing 1 can withstand pressures p which lead to the destruction of the pressure sensor 5. This ensures that these extreme overloads cannot pass through the sensor housing 1 and thus cannot also cause any damage outside the sensor housing 1 or in the surroundings of the pressure measuring sensor.

The greater the wall thickness of the housing wall 25, the lower the hydrogen diffusion rate at which any hydrogen present in the interior 3 in the medium can diffuse through the housing wall 25. Accordingly, the desired hydrogen diffusion tightness of the sensor housing 1 can also be ensured at the same time by means of a corresponding dimensioning of the wall thickness.

The hydrogen diffusion tightness of the sensor housing 1 achievable by a corresponding dimensioning of the wall thickness of the sensor housing 1 offers the advantage that any hydrogen present in the medium cannot pass through the sensor housing 1 and thus cannot cause any impairments outside the sensor housing 1 either.

For application of pressure, the pressure measuring sensor can comprise, for example, a process connection 27, such as the flange shown in FIG. 1 formed there on the sensor housing 1, by means of which the pressure measuring sensor can be mounted on a complementary process connection which is provided at the place of use and conducts the medium. Alternatively, however, other process connection variants which are known from the prior art and are suitable for mounting the pressure measuring sensor and/or for applying pressure to the interior 3 can also be used.

Furthermore, the pressure sensor 5 is designed, for example, as an absolute pressure sensor which measures the pressure p acting on the two measuring bodies 13, 15 as an absolute pressure relative to an internal pressure prevailing in the pressure chamber 11. In particular a vacuum pressure is suitable as the internal pressure. In this case, the pressure chamber 11 enclosed between the measuring bodies 13, 15 is evacuated. Alternatively, however, it is also possible to use an internal pressure which is low in comparison with the pressure p to be measured, for example an internal pressure in the order of magnitude of 1 bar, as the internal pressure. An internal pressure of 1 bar, corresponding in order of magnitude to an atmospheric pressure, offers the advantage that it is very much easier to set in terms of production engineering than a vacuum pressure. In contrast to pressure measuring sensors with a pressure sensor designed as a relative pressure sensor, absolute pressure sensors do not require a reference pressure supply extending through the housing wall 25 and one of the two measuring bodies 13, 15 to pressurize the pressure chamber 11 with a reference pressure. This offers the advantage that, with a corresponding pressure resistance of the sensor housing 1, even an overload leading to the destruction of the pressure sensor 5 cannot pass through the sensor housing 1.

The two measuring bodies 13, 15 are connected, for example, by means of a pressure-resistant connection 29 which connects an outer edge of one measuring body 13 to an outer edge of the other measuring body 15 and surrounds the pressure chamber 11 externally on all sides.

A suitable pressure-resistant connection 29 in connection with measuring bodies 13, 15 made of ceramic is, for example, an active braze, such as an active braze produced by means of a zirconium-nickel-titanium active brazing solder.

Alternatively, the connection 29 is designed, for example, as a pressure-resistant and hydrogen-diffusion-tight connection. For this purpose, the connection 29 is designed, for example, as a glass soldering.

As a further alternative, the pressure-resistant and hydrogen-diffusion-tight connection 29' of the two measuring bodies 13, 15 can be achieved, for example, in the manner shown in FIG. 2 in that the two measuring bodies 13, 15 are connected to one another via a hydrogen-diffusion-tight ring 31, such as a ceramic ring, which is connected to both measuring bodies 13, 15 in each case by a hydrogen-diffusion-tight joint 33, for example a weld produced by means of a ceramic welding method such as laser welding. A laser welding method which can be used for laser welding ceramic measuring bodies 13, 15 is described, for example, in DE 10 2011 004 722 A1. Alternatively, the ring 31 can be formed as an integral component of one of the two measuring bodies 13 or 15, which is connected to the other measuring body 15 or 13 by the hydrogen-diffusion-tight joint 33.

The configuration of the connection 29, 29' as a hydrogen-diffusion-tight connection is particularly advantageous when the pressure sensor 5 is designed as an absolute pressure sensor, and the pressure measuring sensor is used to measure pressures of hydrogen-containing media. There, in combination with the comparatively thick measuring bodies 13, 15, which thus likewise form a long-term stable, high-quality hydrogen diffusion barrier due to the extremely low hydrogen diffusion rate of hydrogen into ceramic, it offers the advantage that a high-quality, permanent protection of the pressure chamber 11 from hydrogen penetrating into the pressure chamber 11 is provided. This offers the advantage that, even over very long periods of time, pressures p of hydrogen-containing media can be measured without the achievable measurement accuracy being impaired thereby.

Optionally, the pressure transducer is designed to measure very high pressures p, such as pressures p of greater than or equal to 400 bar and/or pressures of up to 1000 bar or even above. For this purpose, the base area and thickness d of the two measuring bodies 13, 15 are preferably dimensioned as a function of the pressure measurement range, and possibly also a desired overload resistance of the pressure sensor 5. In connection with pressures p to be measured of up to 1000 bar, each of the two disk-shaped measuring bodies 13, 15 has, for example, a base area of 200 $mm^2$ to 1300 $mm^2$ and/or a thickness d of 5 mm to 10 mm. In connection with a base area of 200 $mm^2$ to 1300 $mm^2$, a thickness d of greater than or equal to 5 mm offers the advantage that the measuring bodies 13, 15 can easily withstand overloads exceeding the upper pressure measurement range limit of 1000 bar. The smaller the deflectable base area and the greater the thickness d of the measuring bodies 13, 15, the greater the overload resistance.

Conversely, a thickness d of less than or equal to 10 mm ensures that the sum of the pressure-dependent deformations of both measuring bodies 13, 15 is large enough also to be able to measure pressures p far below the upper pressure measurement range limit, such as pressures p of 400 bar to 1000 bar, with comparatively high measurement accuracy.

If two circular disk-shaped measuring bodies 13, 15 are considered by way of example, each having a diameter of 17.5 mm and a thickness d of 5 mm, the outer edges of which are connected to one another by an annular connection 29, 29' with a rectangular cross section with a height of mm and a radial width of 3.3 mm, the distance between the two measuring body centers is 15 μm when a pressure of 400 bar is applied, and 10.7 μm when a pressure of 1000 bar is applied. With this pressure sensor 5, an overload resistance to very high overloads, such as overloads of up to 5500 bar, can be achieved.

If two circular disk-shaped measuring bodies 13, 15 are considered as a second example, each having a diameter of 40 mm and a thickness d of 10 mm, the outer edges of which are connected to one another by an annular connection 29, 29' with a rectangular cross section with a height of 0.028 mm and a radial width of 6.6 mm, the distance between the two measuring body centers is 18.7 μm when a pressure of 400 bar is applied, and 4.8 μm when a pressure of 1000 bar is applied. With this pressure sensor 5, an overload resistance to overloads of up to 1800 bar can be achieved, for example.

As demonstrated in the first example by the change in distance of 4.3 μm resulting from a change in pressure of 400 bar to 1000 bar in the first example, or by the change in distance of 13.9 μm resulting from a change in pressure of 400 bar to 1000 bar in the second example, the changes in the distance between the measuring body centers occurring over the pressure measurement range are large enough to achieve a comparatively high measurement accuracy, for example by means of the capacitive transducer, on the basis of the measuring capacitance Cp dependent on the distance between the two measuring bodies 13, 15.

In particular in the case of pressure sensors 5 whose measuring bodies 13, 15 have a comparatively large base area, the overload resistance can be achieved, for example, by increasing the thickness d of the measuring bodies 13, 15 to thicknesses d of greater than or equal to 10 mm and/or by shrinking the regions of the measuring bodies 13, 15 which are deformable in a pressure-dependent manner. The reduction in the size of the regions of the measuring bodies 13, 15 which are deformable in a pressure-dependent manner can be achieved, for example, by a corresponding increase in the radial width of the annular connection 29, 29' connecting the outer edges of the measuring bodies 13, 15. Such a widening of the connection 29, 29' at the same time offers the advantage that the hydrogen diffusion tightness of the connection 29, 29' is increased as a result. The latter is particularly advantageous when the connection 29 is formed as an active braze.

As previously mentioned, the pressure sensor 5 is mounted on the connection elements 9 free-standing in the interior 3. For this purpose, the pressure sensor 5 is connected, for example, to one end of each connection element 9 by means of a mechanical connection 35 in such a way that the connection 35 is exposed externally on all sides to the pressure p prevailing in the interior 3. A suitable mechanical connection 35 is, for example, a joint, such as a soldering.

The connection elements 9 are designed, for example, as rod-shaped elements which are straight, curved or of another shape. Alternatively or additionally, the connection elements 9 have, for example, a free-standing length L of 1 mm to 10 mm in the interior 3 of the sensor housing 1 and/or a cross-sectional area of 0.05 mm² to 7 mm² corresponding to a diameter of 0.25 mm to 3 mm.

Optionally, at least one or each of the connection elements 9 used for mounting the pressure sensor is also used for the electrical connection of the pressure sensor 5. For this purpose, these connection elements 9 are each designed as electrically conductive connection lines, the ends of which are each connected by means of the mechanical connection 35, in this case designed as an electrically conductive connection, to an associated electrical connection 37 of the pressure sensor 5 arranged in the interior 3.

In FIG. 1, the connections 37 are electrical connections 37 of the electromechanical transducer arranged on an outer surface of the pressure sensor 5. In embodiments in which the sensor electronics 17 are arranged in the sensor housing 1, the connections can however also comprise at least one connection of the sensor electronics 17 connected to the transducer.

Suitable connection lines are in particular connection elements 9 made of a metal, such as connection elements 9 made of Kovar, stainless steel, nickel, copper, a nickel-iron alloy, a copper-nickel alloy, molybdenum, Alumel® or Constantan. Optionally, the free-standing length L in the interior of the connection elements 9 designed as connection lines is surrounded externally by a sheath, such as insulation.

Regardless of the configuration in this regard, the connection elements 9 designed as connection lines each extend through a housing wall 25 through a pressure-resistant electrical feedthrough 39 inserted into the housing wall 25 in a manner electrically insulated from the housing wall 25.

Suitable pressure-resistant feedthroughs 39 are in particular feedthroughs 39 pressure-resistant to pressures p exceeding an upper measurement range limit of the pressure sensor 5, to pressures p exceeding an overload resistance of the pressure sensor 5, and/or to pressures p of up to 2000 bar.

The feedthroughs 39 are each arranged, for example, in a housing wall region 41 of the sensor housing 1 opposite the opening 7. FIG. 1 shows an example in which the sensor housing 1 is designed as a substantially pot-shaped housing, in the housing base of which, opposite the opening 7, the feedthroughs 39 are inserted.

Suitable pressure-resistant feedthroughs 39 are, in particular, feedthroughs such as ceramic feedthroughs or glass feedthroughs which are also hydrogen-diffusion-tight at the same time. Glass and ceramic feedthroughs are known from the prior art and, in addition to their high hydrogen diffusion tightness due to the low diffusion rate of hydrogen into ceramic or into glass, have the advantage that they can withstand very high pressures, such as pressures of up to 1700 bar or even up to 2000 bar, depending on the design. Corresponding ceramic feedthroughs are offered, for example, by Alumina Systems GmbH in Redwitz, Germany and by CeramTec GmbH in Plochingen, Germany. Suitable glass feedthroughs are offered, for example, by HaTec Halebi Technik in Wurzburg, Germany.

In FIG. 1, the transducer of the pressure sensor 5 is connected to the sensor electronics 17 arranged here outside the sensor housing 1 via the connection elements 9 designed as connection lines. This variant offers the advantage that the pressure measurement range is not limited by the pressure resistance of the sensor electronics 17, which is generally lower than the pressure resistance of the pressure sensor 5 and the sensor housing 1. The sensor electronics 17 are preferably arranged directly on the outer side of the sensor housing 1 facing away from the interior 3. As a result, the line length of the electrically conductive connection between transducer and sensor electronics 17 is kept low. Shorter line lengths offer the advantage that the influence of electromagnetic interference signals and/or parasitic capacitances on the achievable measurement accuracy is thereby reduced.

FIG. 3 shows a view of the inner side of the measuring body 13, which is equipped with the measuring electrode 19 and the reference electrode 23, of FIG. 1, in which, at the same time, an example of positions of contact pins Km, Kref extending through this measuring body 13 for contacting the measuring electrode 19 and reference electrode 23 is also shown. If the connection 29 indicated by dashed lines in FIG. 3 is electrically conductive between the two measuring bodies 13, 15, the counter electrode 21, which is arranged on the measuring body 15 opposite the measuring electrode 19 and is in electrically conductive contact with the connection 29, can also be contacted via a contact pin Kg extending through the measuring body 13 shown in FIG. 3 to the connection 29. If the two measuring bodies 13, 15 are connected to one another via an electrically insulating connection 29, 29', such as, for example, a glass soldering or the ring 31 shown in FIG. 2, the electrical contacting of the counter electrode 21 can take place, for example, in the manner shown as an option in FIG. 2. There, the contact pin Kg for contacting the counter electrode 21 extends through one of the two measuring bodies 13 and the electrically insulating connection 29' to a region of the counter electrode 21, which is adjacent to an end face of the connection 29' facing away from the measuring body 13 surrounding the contact pin Kg.

In the variants shown in FIGS. 1 to 3, all the connections 37 of the pressure sensor 5, which are arranged at the end of one of the contact pins Km, Kr, Kg, are arranged next to one another in one plane on the same outer side of the pressure sensor 5.

FIG. 4 shows a modification of the pressure measuring sensor of FIG. 1, in which the connections 37 of the pressure sensor 5 are arranged on mutually opposite outer sides of the pressure sensor 5. In this example, the measuring electrode 19 is connected via the contact pin Km extending through one of the measuring bodies 13 to the connection 37 arranged on the outer side of this measuring body 13, and the counter electrode 21 is connected via the contact pin Kg extending through the other measuring body 15 to the connection 37 arranged on the outer side of the other measuring body 15. Analogously to the example shown in FIG. 1, the modification shown in FIG. 4 can of course also be equipped with a reference capacitor with substantially pressure-independent capacitance, which comprises at least one electrode which is connected via a contact pin extending through one of the measuring bodies 13, 15 to a connection arranged on an outer side of the pressure sensor 5.

Optionally, the pressure measuring sensor comprises measuring electronics 43 which are connected to the sensor electronics 17 and are configured to determine and provide a pressure measurement result $p_{gem}$ on the basis of the measurement signal. Measuring electronics known from the prior art can be used for this purpose. The measuring electronics 43 shown as an example in FIG. 1 comprise a signal processing unit 45 and a signal evaluation unit 47 downstream of the signal processing unit 45. The signal processing unit 45 is configured, for example, to amplify the measurement signal, to filter out interference signals present in the measurement signal and/or to smooth the measurement signal. The signal evaluation unit 47 is configured to determine and provide the pressure measurement result $p_{gem}$ on the basis of the processed measurement signal.

Even though the invention has been described above using the example of pressure measuring sensors with pressure sensors 5 with ceramic measuring bodies 13, 15, pressure sensors with measuring bodies 13, 15 consisting of other materials can alternatively also be used. The measuring bodies 13, 15 of the pressure measuring sensors described with reference to FIGS. 1 to 4 can thus consist, for example, of another insulator, such as glass. In this case, the connection 29 shown in FIG. 1 is for example a glass soldering. Alternatively, measuring bodies 13, 15 made of glass can be connected, for example, via the connection 29' described with reference to FIG. 2. In this case, the ring 31 is, for example, a glass ring which is connected to one of the two measuring bodies 13, 15 or to both measuring bodies 13, 15 in each case via one of the joints 33 shown in FIG. 2, such as, for example, a joint formed as a glass soldering.

Figure 5:
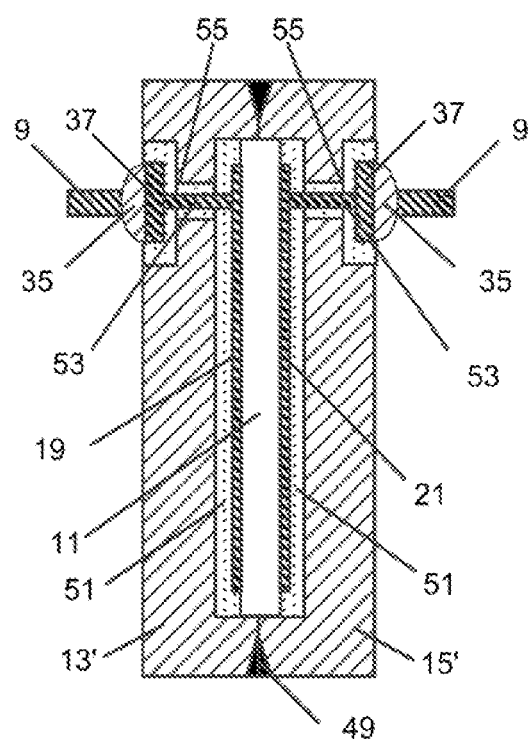
FIG. 5 shows a metallic pressure sensor.

Depending on the place of use, it is even possible under certain circumstances to use pressure sensors whose measuring bodies 13', 15' consist of a metal, such as a stainless steel. FIG. 5 shows an example of a pressure sensor with two metallic measuring bodies 13', 15' connected to one another while enclosing the pressure measuring chamber 11, via a connection 49, such as a weld. This pressure sensor is also designed, for example, as a capacitive pressure sensor. In this respect, the pressure sensor shown in FIG. 5 differs from the pressure sensors 5 shown in FIGS. 1 and 4 substantially only in that the electrodes of the transducer, such as the measuring electrode 19 shown in FIG. 5 and the counter electrode 21 shown in FIG. 5, are each arranged with interposition of an insulator 51 on one of the two mutually opposing inner sides of the metallic measuring bodies 13', FIG. 5 shows by way of example insulators 51 which are each designed as an inlay, such as an inlay made of glass or ceramic, inserted into one of the two measuring bodies 13', 15'. In analogy to the previously described exemplary embodiments, the electrical connection of the transducer is made, for example, via connection lines 53 connected to the electrodes, such as the measuring electrode 19 and the counter electrode 21, each of which connection lines is connected to one of the connections 37 arranged on one of the outer sides of the pressure sensor through a feedthrough 55 which electrically insulates the respective connection line 53 from the respective measuring body 13', 15'.

The invention claimed is:

1. A pressure measuring sensor for measuring a pressure of a medium, comprising:
    a sensor housing;
    a pressure sensor including:
        two measuring bodies connected to one another and enclosing a pressure chamber, wherein the two measuring bodies are each deformable by the pressure of the medium; and
        an electromechanical transducer embodied to convert a mechanical variable that is dependent on a sum of pressure-dependent deformations of both measuring bodies into a measurable electrical measurement variable,
    wherein the pressure sensor is arranged in an interior of the sensor housing, wherein the sensor housing has an opening via which the pressure sensor is exposed to the medium under the pressure to be measured,
    wherein the pressure sensor is mounted on connection elements protruding into the interior and free-standing in the interior such that the pressure sensor is exposed on all sides to the pressure prevailing in the interior.

2. The pressure measuring sensor according to claim 1, wherein at least one of the connection elements or each connection element is in each case designed as an electrically conductive connection line, the end of which is connected by an electrically conductive mechanical connection to an associated electrical connection of the pressure sensor that is arranged on an outer side of the pressure sensor, and
    wherein each connection element designed as a connection line extends through a housing wall through a pressure-resistant feedthrough inserted into the housing wall of the sensor housing in a manner electrically insulated from the housing wall.

3. The pressure measuring sensor according to claim 2, wherein each feedthrough is designed as a hydrogen-diffusion-tight feedthrough, is designed as a ceramic feedthrough or as a glass feedthrough, and/or is designed as a feedthrough pressure-resistant to pressures exceeding an upper measurement range limit of the pressure sensor, to pressures exceeding an overload resistance of the pressure sensor, and/or to pressures of up to 2000 bar.

4. The pressure measuring sensor according to claim 3, wherein each feedthrough is arranged in a housing wall region of the sensor housing opposite the opening.

5. The pressure measuring sensor according to claim 1, wherein the sensor housing surrounding the interior is embodied of metal or stainless steel, is hydrogen-diffusion-tight, and/or is designed as a sensor housing pressure-resistant to pressures exceeding an upper measurement range limit of the pressure sensor, to pressures exceeding an overload resistance of the pressure sensor, and/or to pressures of up to 2000 bar.

6. The pressure measuring sensor according to claim 1, wherein the pressure sensor is connected to one end of each connection element via a mechanical connection, via a mechanical, electrically conductive connection, or via a connection designed as a soldering such that the connection is exposed externally on all sides to the pressure prevailing in the interior.

7. The pressure measuring sensor according to claim 1, wherein the connection elements are designed as rod-shaped elements which are straight, curved, or of another shape, have a free-standing length in the interior of 1 mm to 10 mm, have a diameter of 0.25 mm to 3 mm and/or a cross-sectional area of 0.05 $mm^2$ to 7 $mm^2$, are designed as metallic connection elements, are embodied of Kovar®, stainless steel, nickel, copper, a nickel-iron alloy, a copper-nickel alloy, molybdenum, Alumel® or Constantan, and/or are surrounded by a sheath or insulation.

8. The pressure measuring sensor according to claim 1,
wherein the pressure sensor is designed as an absolute pressure sensor which measures the pressure acting on the two measuring bodies as absolute pressure relative to an internal pressure prevailing in the pressure chamber, an internal pressure designed as a vacuum pressure, or an internal pressure in the order of magnitude of 1 bar, and
wherein the two measuring bodies are connected to one another via a pressure-resistant connection or a pressure-resistant and hydrogen-diffusion-tight connection, wherein the connection surrounds the pressure chamber externally on all sides.

9. The pressure measuring sensor according to claim 1,
wherein the two measuring bodies are embodied of glass and are connected to one another via a connection which surrounds the pressure chamber externally on all sides or via a connecting connection which surrounds the pressure chamber externally on all sides and includes a glass ring and/or a glass soldering, or
wherein the two measuring bodies are embodied of metal or stainless steel and are connected to one another via a connection which surrounds the pressure chamber externally on all sides or a connection which surrounds the pressure chamber externally on all sides and includes a weld, or
wherein the two measuring bodies are embodied of ceramic and are connected to one another via a connection which surrounds the pressure chamber externally on all sides, wherein the connection is designed as an active braze or as a glass soldering, or includes a ring or a ring formed as a ceramic ring, wherein the ring either is connected in a hydrogen-diffusion-tight manner to each of the two measuring bodies via a hydrogen-diffusion-tight joint or via a joint designed as a weld produced by means of a laser welding method, or is designed as a component of one of the two measuring bodies and is connected in a hydrogen-diffusion-tight manner to the other measuring body via a hydrogen-diffusion-tight joint or a joint designed as a weld produced by means of a laser welding method.

10. The pressure measuring sensor according to claim 1, wherein the transducer of the pressure sensor is connected via the connection elements to sensor electronics arranged outside the sensor housing, which sensor electronics are designed to provide a measurement signal which reproduces a pressure measured by means of the pressure sensor.

11. The pressure measuring sensor according to claim 10,
wherein the transducer includes a measuring electrode which is arranged on an inner side of one of the two measuring bodies and, together with a counter electrode arranged on an inner side of the other measuring body facing this measuring body, forms a capacitor with a measuring capacitance which is dependent on the sum of the pressure-dependent deformations of both measuring bodies, and
wherein the measuring electrode and the counter electrode are each electrically conductively connected to a connection arranged on an outer side of the pressure sensor via a connection line extending through one of the two measuring bodies or via a contact pin extending through one of the two measuring bodies.

12. The pressure measuring sensor according to claim 11, wherein the contact pin connected electrically conductively to the counter electrode arranged on the inner side of one of the two measuring bodies extends through the other measuring body opposite the counter electrode, and either is electrically conductively connected to the counter electrode via an electrically conductive connection connecting the two measuring bodies to one another, or extends through a connection connecting the two measuring bodies to one another as far as a region of the counter electrode which is adjacent to an end face of the connection facing away from the measuring body surrounding the contact pin.

13. The pressure measuring sensor according to claim 1, wherein the measuring bodies are embodied of ceramic, glass, metal, or stainless steel.

14. The pressure measuring sensor according to claim 1,
wherein the pressure sensor is designed to measure pressures in a pressure measurement range of greater than or equal to 400 bar and/or of less than or equal to 1000 bar, and/or
wherein the pressure sensor is designed as a pressure sensor overload-resistant to overloads exceeding an upper measurement range limit of the pressure sensor of up to 1800 bar or up to 5500 bar.

15. The pressure measuring sensor according to claim 1, wherein the measuring bodies are each designed as disk-shaped or as structurally identical, disk-shaped measuring bodies which each have a base area of 200 $mm^2$ to 1300 $mm^2$ and/or a thickness of 5 mm to 10 mm.

* * * * *